United States Patent [19]
Wegner et al.

[11] Patent Number: 5,377,186
[45] Date of Patent: Dec. 27, 1994

[54] SYSTEM FOR PROVIDING ENHANCED SUBSCRIBER SERVICES USING ISUP CALL-SETUP PROTOCOL

[75] Inventors: David C. Wegner, Garland, Tex.; Robert I. Shepard, Lakewood, Colo.

[73] Assignee: Telefonaktiebolaget L M Ericsson, Stockholm, Sweden

[21] Appl. No.: 95,300

[22] Filed: Jul. 21, 1993

[51] Int. Cl.[5] .............................................. H04J 3/12
[52] U.S. Cl. ................................... 370/62; 370/110.1; 379/201; 379/207; 379/211; 379/230
[58] Field of Search ..................... 370/94.1, 110.1, 62; 379/157, 201, 207, 210, 211, 212, 213, 224, 230, 258

[56] References Cited

U.S. PATENT DOCUMENTS

| | | | |
|---|---|---|---|
| 4,811,334 | 3/1989 | Matt ...................................... | 370/60 |
| 5,193,110 | 3/1993 | Jones et al. ........................... | 379/94 |
| 5,204,861 | 4/1993 | Wiebe ................................. | 370/110.1 |
| 5,237,604 | 8/1993 | Ryan .................................... | 379/220 |
| 5,241,588 | 8/1993 | Babson, III et al. ................. | 379/201 |
| 5,251,255 | 10/1993 | Epley ................................... | 379/242 |

OTHER PUBLICATIONS

*Advanced Intelligent Network (AIN) 0.1 Switch–Service Control Point (SCP) Application Protocol Interface Generic Requirements*, Bellcore, Bell Communications Research, Technical Advisory, TA-NWT-001285, Issue 1, Jan. 1992.

*Switching System Generic Requirements Supporting ISDN Access Using the ISDN User Par*, Bellcore, Bell Communications Research, Technical Advisory, TA-NWT-000444, Issue 4, Aug. 1992.

*Switching System Generic Requirements for Interexchange Carrier Interconnection Using the Integrated Services Digital Network User Part (ISDNUP)*, Bellcore, Bell Communications Research, Technical Advisory, TA-NWT-000394, Issue 5, Apr. 1993.

*Advanced Intelligent Network (AIN) Service Control Point (SCP) Generic Requirements*, Bellcore, Bell Communications Research, Technical Advisory, TA-NWT-001280, Issue 1, Aug. 1992.

*Primary Examiner*—Douglas W. Olms
*Assistant Examiner*—Russell W. Blum
*Attorney, Agent, or Firm*—Johnson & Wortley

[57] ABSTRACT

A system and method for retrieving enhanced subscriber services from at least one database and delivering those services to the subscribers of a telecommunications network without requiring the expensive upgrading of local switches (LSs) to operate with the Transaction Capabilities Application Part/Advanced Intelligent Network (TCAP/AIN) communications protocol. The system comprises a plurality of LSs which are connected to an Advanced Intelligent Network (AIN) and provide the subscribers with access to the network. The system also includes at least one virtual service switching point (ViSSP) within the AIN for storing the database of enhanced subscriber services. LSs or tandem switches may retrieve enhanced subscriber services from the ViSSP utilizing the Integrated Services Digital Network User Part (ISUP) call-setup protocol.

6 Claims, 8 Drawing Sheets

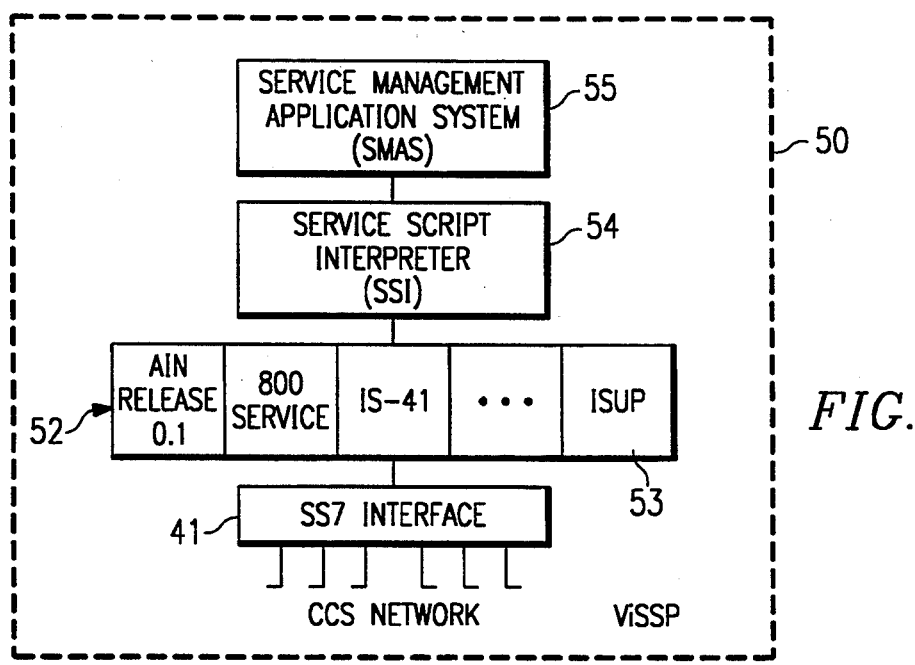

FIG. 7

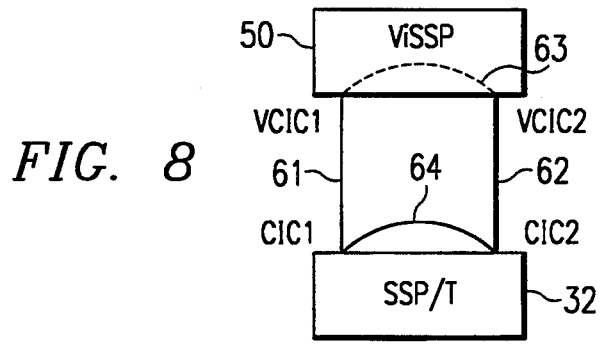

FIG. 8

| IAM and IAM (Call-Forward) Parameters | SSI Tag |
|---|---|
| Nature of connection indicators | NCI Tag (new) |
| Forward call indicators | FCI Tag (new) |
| Calling party's category | ACAT Tag |
| User service information | USI Tag (new) |
| Called party number | BNR Tag |
| Calling party number | ANR Tag |
| Charge number | BN Tag |
| Originating line information | OST Tag |
| Transit network selection | TNS Tag (new) |
| Carrier selection | First Word of CID Tag |
| Service code indicator | SCI Tag (new) |
| Redirection information | RDIRINF Tag |
| Original called party | ORIGBNR Tag |
| Redirecting number | RDIRNR Tag |

FIG. 9

SYSTEM FOR PROVIDING ENHANCED SUBSCRIBER SERVICES USING ISUP CALL-SETUP PROTOCOL

BACKGROUND OF THE INVENTION

1. Field of the Invention

This invention relates to telephone switching and, more particularly, to a telecommunications system having local telephone switches capable of retrieving and deploying enhanced subscriber services from an Advanced Intelligent Network (AIN) using a call-setup protocol.

2. History of the Prior Art

Modern telecommunications systems offer subscribers a large number of enhanced subscriber services. These services may include the provision of an 800 Services Database, a Credit Card Verification Database, Geographic Call Routing, Incoming Call Routing, Multi-location Extension Dialing, Network Automatic Call Distribution, Flexible Call Routing, Flexible Carrier Selection, CLASS Calling Name Delivery Database, and others. Some telephone service providers are currently analyzing the use of a system known as the Advanced Intelligent Network (AIN) to provide these services.

FIG. 1 is a simplified block diagram of a typical telecommunications system 11 using an Advanced Intelligent Network (AIN) 12 to provide enhanced subscriber services. The AIN 12 and its associated Signaling System Number 7 (SS7) protocol are described in the industry standard, "TR-NWT-000246, Bell Communications Research Specification of Signaling System Number 7," which is hereby incorporated by reference. A large number of Local Switches (LSs) 13a-n may be connected to a Service Switching Point/Tandem (SSP/T) 14 via multi-frequency (MF) links 15. "tandem", as used herein, may be a local, LATA, or access tandem. The LSs 13a-n provide connections for subscribers 16a-n into the telecommunications system 11. The AIN 12 uses a system of high speed telecommunications links known as a Common Channel Signaling (CCS) network which employs the standard SS7 signaling protocol to link all of the components of the AIN 12. Standard telephony diagrams, and all figures herein, indicate links utilizing the SS7 signaling protocol as dotted lines and MF trunks as solid lines.

The components of the AIN 12 may include the SSP/T 14, one or more Signal Transfer Points (STPs) 18a-n which act as intermediate switching nodes, and one or more Service Control Points (SCPs) 19a-n. The SCPs 19 each contain a database of enhanced subscriber services which are accessed and controlled by a Service Logic Program (SLP). The SCP 19 currently utilizes a standardized protocol known as Transaction Capabilities Application Part (TCAP) for coordination of functions. The current version of the protocol required for communication with the SCP 19 is TCAP/AIN Release 0.1. The SCP 19 is described in the Bellcore standard, "TA-NWT-001280, Advanced Intelligent Network (AIN) Service Control Point (SCP) Generic Requirements," which is hereby incorporated by reference. The SCP 19 acts as a repository for enhanced subscriber services which may be accessed by any one of the LSs 13a-n. In the past, each LS had to be individually upgraded with enhanced subscriber services. With the implementation of the AIN 12, and the required communications capabilities in the LSs, new enhanced services need only be added to the SCP 19.

LSs 13 which have been upgraded to communicate utilizing the SS7 signaling protocol, and the latest release of the TCAP/AIN communications protocol, may communicate directly with an STP 18 and from there with an SCP 19 or other SSP/Ts, utilizing the high speed CCS network. LSs 13 which have not been upgraded with SS7 signaling capability, or with the TCAP/AIN communications protocol, must communicate over lower speed MF trunks 15 with the SSP/T 14 which, in turn, utilizes the SS7 signaling protocol, the TCAP/AIN communications protocol, and the CCS network to communicate with the STPs 18 and the SCPs 19. Dependence on MF trunks for access to the AIN 12 can substantially lengthen the time required to retrieve subscriber services, and ties up an expensive MF trunk which remains open and occupied during the retrieval period. The message flow utilized to retrieve an enhanced subscriber is described in more detail in conjunction with FIG. 4 below.

Another transaction often carried out utilizing the CCS network is call setup. Call-setup messages utilize a call-setup protocol known as the Integrated Services Digital Network (ISDN) User Part (ISUP) call-setup protocol. The ISUP call-setup protocol is described in the Bellcore standards, "TR-NWT-000317, Switching System Generic Requirements for Call Control Using the Integrated Services Digital Network User Part (ISDNUP)", "TR-NWT000394, Switching System Generic Requirements for Interexchange Carrier Interconnection Using the Integrated Services Digital Network User Part (ISDNUP)", and "TR-NWT000444, Switching System Requirements Supporting ISDN Access Using the ISDN User Part", which are hereby incorporated by reference.

FIG. 2 is a simplified block diagram illustrating a typical message flow utilized for call setup between two local telephone switches (LSs) 13 and 23 which have not been upgraded to utilize the ISUP call-setup protocol. Each non-I SUP LS is typically connected through a MF trunk 15 to an associated SSP/T. Thereafter, a series of ISUP messages is sent back and forth between an originating SSP/T 14, associated with a calling subscriber 16, and a destination SSP/T 24, associated with the called subscriber 21. The ISUP messages during call setup include an Initial Address Message (IAM) 22, an Address Complete Message (ACM) 25, an Answer Message (ANM) 26, a Release Message (REL) 27, and a Release Complete Message (RLC) 28. The ISUP messages are routed via the STP 18.

Many LSs in use today have been upgraded to utilize the ISUP call-setup protocol. FIG. 2a is a simplified block diagram illustrating a typical message flow utilized for call setup between two local telephone switches (LSs) 13 and 23 which have been upgraded to utilize the ISUP call-setup protocol. This upgrade allows ISUP-capable LSs to bypass the MF trunk link to the SSP/T, and communicate directly through the STP 18. Thus, the LS may perform call setup entirely over the CCS high speed telecommunications network. The CCS network is capable of transmitting at much higher data rates than multi-frequency (MF) trunks, and call setup can be completed over the CCS network much faster and more efficiently than in the past.

When utilizing the SS7 signaling protocol and the ISUP call-setup protocol for call setup, out-of-band signaling messages replace Multi-frequency (MF) and other in-band interoffice signaling mechanisms on selected circuits. The out-of-band messages are used to report circuit seizure and to transport address information, answer supervision, circuit release, etc. Thus, the network use of the SS7 signaling protocol for circuit-switched call connection and release differs fundamentally from traditional in-band circuit signaling. Instead of sending information on the facilities used for subscriber-to-subscriber communication, the switching system sends signaling information via a separate signaling network. The SS7 signaling protocol thereby allows switching systems to exchange information related to a circuit-switched connection even when the circuit is in the conversation mode.

FIG. 3 is a flow chart illustrating the typical manner in which a call is set up via the ISUP call-setup protocol, for both non-ISUP LSs and ISUP-capable LSs. At step 101, a calling subscriber 16 (FIGS. 2 and 2a) dials the telephone number of a distant subscriber 21. At step 102, if the LSs are not ISUP-capable, the call is routed over MF trunks to an originating SSP/T 14 at step 103. At step 104, ISUP call setup is invoked in the SSP/T 14 which then recognizes the dialed number as a number which requires ISUP routing, and seizes an ISUP trunk at 105. At 106, the originating SSP/T 14 then utilizes the ISUP call-setup protocol to send an Initial Address Message (IAM) 22, via the STP 18, to a destination SSP/T 24, asking for the status of the dialed subscriber's phone 21. At step 107, the destination SSP/T 24 queries the destination LS 23 about the status of the called subscriber's phone 21. The destination LS 23 determines the status of the called subscriber's phone 21, i.e., busy, idle, forwarded, out of service, etc. , at step 108, and returns this status to the destination SSP/T 24. At 109, the destination SSP/T 24 returns, via the STP 18, an Address Complete Message (ACM) 25 to the originating SSP/T 14, containing the status of the called subscriber's phone 21. The originating SSP/T 14 receives the ACM 25 and at step 110, the destination SSP/T 24 returns, via the STP 18, an Answer Message (ANM) 26 to the originating SSP/T 14 indicating that a MF trunk should be set up between the two SSP/Ts 14 and 24. At step 111, the MF trunk 15 between the originating SSP/T 14 and the destination SSP/T 24 is connected thereby providing speech capability between the calling subscriber 16 and the called subscriber 21. Once the call is terminated at step 112, a Release Message (REL) 27 is sent from the switch serving the first subscriber to hang up, to the switch serving the other subscriber. In response, a Release Complete Message (RLC) 28 i s returned.

If, however, at step 102 it was determined that the LSs are ISUP-capable, then the message flow moves to step 113 where ISUP call setup is invoked in the originating LS 13. The originating LS 13 recognizes the dialed number as a number which requires I SUP routing and seizes an ISUP trunk at 114, and at 115 sends an I AM 22 to the destination LS 23 via the STP 18 requesting the status of the dialed subscriber's phone 21. At 116, the destination LS 23 determines the status of the dialed subscriber's phone and returns an ACM 25 to the originating LS 13 containing the status. At step 117, the originating LS 13 returns an ANM 26 indicating that a MF trunk should be set up between the two SSP/Ts 14 and 24. At 118, the MF trunk 15 between the originating SSP/T 14 and the destination SSP/T 24 is connected thereby providing speech capability between the calling subscriber 16 and the called subscriber 21. Once the call is terminated at step 119, a REL 27 is sent from the switch serving the first subscriber to hang up, to the switch serving the other subscriber. In response, a Release Complete Message (RLC) 28 i s returned.

FIG. 3a is a message flow diagram illustrating the flow of messages from a non-ISUP LS 13 to an ISUP-capable LS 23 during call setup and call release. At 201, the non-ISUP LS 13 seizes an MF trunk to the SSP/T 14. At 202, the SSP/T 14 sends an Initial Address Message (IAM) to the STP 18 which forwards it to the SSP/T 24 serving the called subscriber 21. At 204, the IAM is sent to the ISUP-capable LS 23 serving the called subscriber 21.

An Address Complete Message (ACM) is returned to the SSP/T 24 at 205. At 206, the ACM is sent to the STP 18 where it is forwarded to the SSP/T 14 at 207. An Answer message (ANM) is returned from the LS 23 to the SSP/T 24 at 208. At 209, the ANM is sent to the STP 18 where it is forwarded to the SSP/T 14 at 211. At 212, an answer signal is sent over the MF trunk to the non-I SUP LS 13.

Termination of the call is begun after the first subscriber hangs up (in this example, subscriber 16a). At 213, a release signal is sent over the MF trunk from the non-I SUP LS 13 to the SSP/T 14. A Release message (REL) is sent from the SSP/T 14 to the STP 18 at 214 which forwards the REL to the SSP/T 24 at 215. At 216, the REL is received by the LS 23 which returns a Release Complete Message (RLC) to the SSP/T 24 at 217. At 218, the SSP/T 24 sends the RLC to the STP which forwards the RLC to the SSP/T 14 at 219. At 221, a release complete signal over the MF trunk results in the disconnection of the call.

Referring again to FIG. 1, it can be seen that LSs 13a-n may access the AIN 12 either through MF trunks 15 and the SSP/T 14, or directly through SS7 links 17 to the STP 18. The message flows involved in determining the type of access, and in the method of service retrieval from the database in the SCPs 19, is shown in the flow diagram of FIG. 4. At step 121, a calling subscriber 16a (FIG. 1) dials the telephone number of a called subscriber 16n. At 122, it is determined whether or not the originating LS 13a has been upgraded to utilize the SS7 signaling protocol. If not, then the LS cannot directly access the AIN 12, and the signal is routed, at step 123, to the associated telephone Service Switching Point/Tandem (SSP/T) 14 via a low speed MF trunk 15. At step 124, AIN service is invoked in the SSP/T 14 which recognizes the dialed number as an AIN subscriber at 125. At step 126, the SSP/T 14 sends a Query message via the STP 18 to the SCP 19 requesting call processing instructions. The SCP performs a database lookup on the called subscriber's service that is being invoked at step 127, and then returns routing instructions to the SSP/T 14 at step 128. This response contains all of the information that is necessary to route the call (i.e., routing number, carrier, billing number, etc.). The SSP/T 14 receives the routing instructions from the SCP 19, and completes the call at step 129 by setting a MF trunk 15 between the calling subscriber 16a and the called subscriber 16n.

If, however, at step 122 it is determined that the LS is SS7-capable, then the message flow moves to step 131 where it is determined whether or not the LS has been upgraded with the latest release of the TCAP/AIN communications protocol. If not, then the flow again moves to step 123 where the signal is routed to the associated SSP/T 14 via MF trunk 15. Steps 124 through 129 are then utilized to retrieve the enhanced subscriber service.

If, at step 131, it is determined that the LS has been upgraded with the latest release of the TCAP/AIN communications protocol, then the LS may directly access the AIN 12. At step 132, AIN service is invoked in the LS which recognizes the dialed number as an AIN subscriber at 133. At step 134, the LS sends a Query message via the STP 18 to the SCP 19 requesting call processing instructions. The SCP performs a database lookup on the called subscriber's service that is being invoked at step 135, and then returns routing instructions to the LS 13 at step 136. This response contains all of the information that is necessary to route the call (i.e., routing number, carrier, billing number, etc.). The LS 13 receives the routing instructions from the SCP 19, and completes the call at step 137 by setting a MF trunk 15 between the calling subscriber 16*a* and the called subscriber 16*n*.

A major problem with the full implementation of enhanced subscriber services through the AIN 12 is the extremely high cost of the system to the service providers. The major factor in the expense of implementing an AIN is that each of the hundreds of LSs must be hardware/software upgraded to be able to communicate with the SCP 19 in order to access each of the stored subscriber services. The current interface requirements for the SCP 19 are described in the Bellcore standard, "TR-NWT001285 Advanced Intelligent Network (AIN) 0.1 Switch-Service Control Point (SCP) Application Protocol Interfaces Generic Requirements," which is hereby incorporated by reference. The upgrade to the LSs includes the implementation of the most recent version of the TCAP/AIN communications protocol (currently Release 0.1) in the LSs. Telephone service providers typically have hundreds of LSs, and although the cost for each provider will vary, each provider may, for example, be faced with an expense in excess of $500 million to upgrade its LSs to operate with the current release of the TCAP/AIN protocol.

Another problem is encountered by LSs which are SS7 and ISUP-capable, but are not AIN-capable and have not been upgraded to access a particular subscriber services such as 800 service, which currently requires its own communications protocol. As shown in FIG. 4, these LSs 13 (FIG. 1) must set up low data rate MF trunks to the SSP/T 14 in order to access the AIN and the SCP 19 which stores the 800 service. Thereafter, the SSP/T 14 communicates via the high speed CCS network and SS7 signaling protocol with the SCP 19 in order to retrieve the requested service. Modern industry regulations and service expectations are requiring LSs to provide enhanced services at faster connection times than are achievable with MF trunks.

It would be a distinct advantage to have a system which provides a database of enhanced subscriber services which may be accessed by LSs utilizing the high speed CCS network, but does not require the expensive upgrading of LSs to operate with the TCAP/AIN communications protocol. It would be another advantage to have a system which enables all LSs to connect directly into the AIN via the SS7 signaling protocol rather than using slower MF trunks through the SSP/T. The present invention provides such a system.

SUMMARY OF THE INVENTION

In one aspect, the present invention is a system for retrieving enhanced subscriber services from at least one database and delivering those services to the subscribers of a telecommunications network. The system comprises a plurality of local switches (LSs), or tandem switches, which are connected to the telecommunications network and provide the subscribers with access to the network. The system also includes at least one virtual service switching point (ViSSP) within the telecommunications network for storing the database of enhanced subscriber services. Means are also provided for enabling the LSs or tandems to retrieve the subscriber services from the ViSSP utilizing a call-setup protocol. The call-setup protocol utilized in the preferred embodiment is the Integrated Services Digital Network User Part (ISUP) call-setup protocol. The system does not require the expensive upgrading of the LSs to operate with the TCAP/AIN communications protocol.

In another aspect, the present invention is a method of retrieving subscriber services from at least one database within a telecommunications network and delivering those services to subscribers of the telecommunications network. The method first provides the subscribers with access to the network. The subscriber services are then stored in at least one database within the network, and are retrieved from the database utilizing a call-setup protocol which may be, for example, the ISUP call-setup protocol.

BRIEF DESCRIPTION OF THE DRAWING

The invention will be better understood and its numerous objects and advantages will become more apparent to those skilled in the art by reference to the following drawing, in conjunction with the accompanying specification, in which:

FIG. 7 is a simplified block diagram of a portion of the architecture of a ViSSP within an AIN, which has been constructed in accordance with the teachings of the present invention;

FIG. 8 is a block diagram illustrating the signaling links and looped circuits between the ViSSP and the SSP/T in the preferred embodiment of the present invention;

FIG. 9 is an illustration of the mapping of the parameters of an ISUP Initial Address Message (IAM) and an IAM (Call -Forward) message to Service Script Interpreter (SSI) tags, which occurs in an ISUP protocol translator in the preferred embodiment of the present invention;

DETAILED DESCRIPTION

Figure 1:
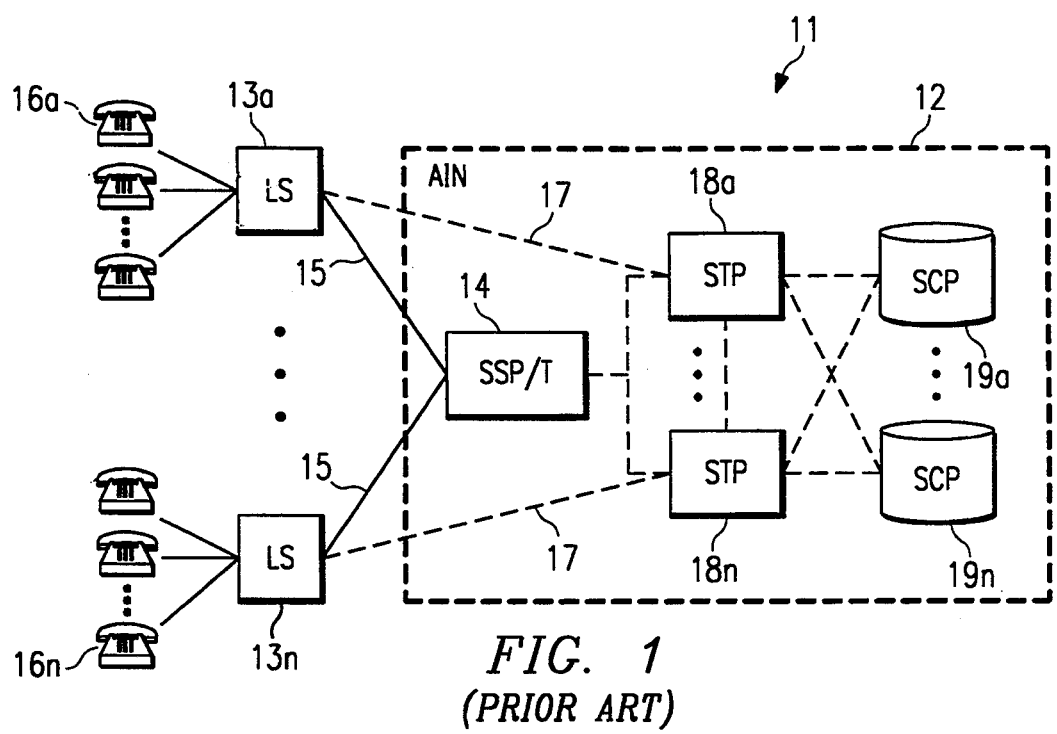
FIG. 1 (Prior Art) is a simplified block diagram of a typical telecommunications system using an Advanced Intelligent Network (AIN) to provide enhanced subscriber services.
Figure 2:
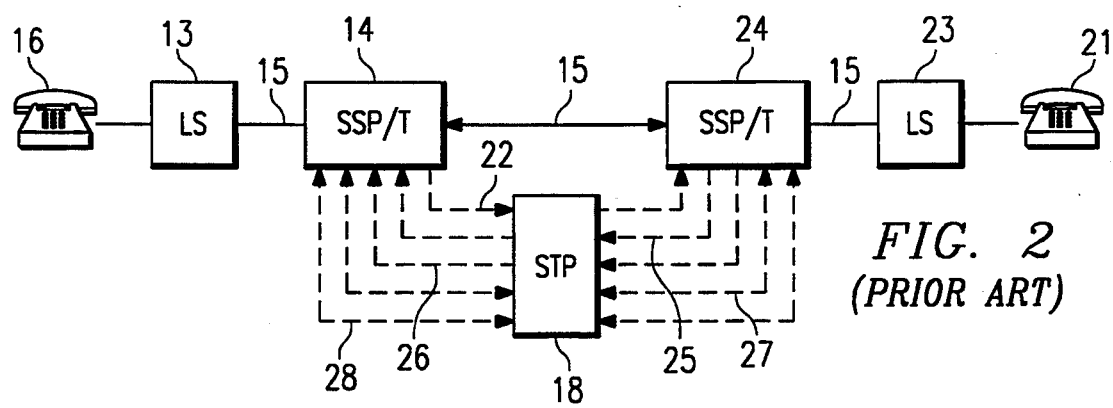
FIG. 2 (Prior Art) is a simplified block diagram illustrating a typical message flow utilized for call setup between two local telephone switches (LSs) which have not been upgraded to utilize the Integrated Services Digital Network User Part (ISUP) call-setup protocol.
Figure 5:
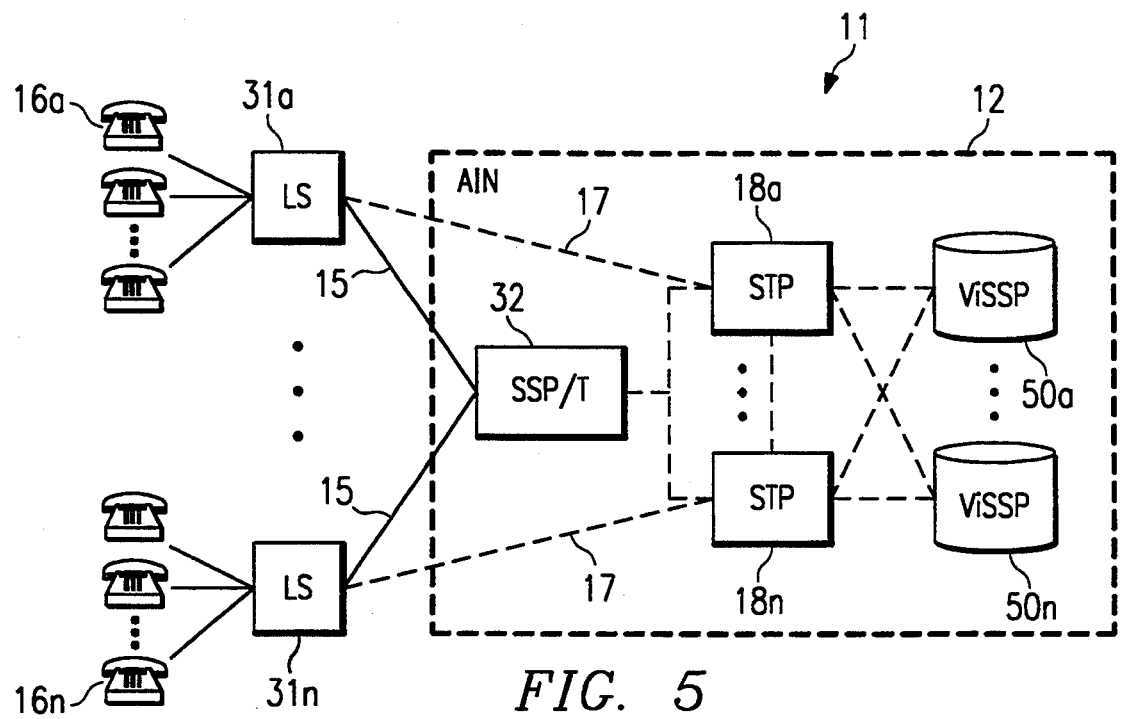
FIG. 5 is a simplified block diagram of the preferred embodiment of a telecommunications system using an AIN to provide enhanced subscriber services, and which is equipped with Virtual Service Switching Points (ViSSPs) and LSs and Service Switching Point Tandems (SSP/Ts) modified in accordance with the teachings of the present invention.

FIG. 5 is a simplified block diagram of the preferred embodiment of a telecommunications system using an AIN to provide enhanced subscriber services, and which is equipped with Virtual Service Switching Points (ViSSPs) and LSs and SSP/Ts modified in accordance with the teachings of the present invention. The modified LSs 31a–n utilize the ISUP call-setup protocol, previously used only for call setup, to access a modified SCP known as a Virtual Service Switching Point (ViSSP) 50 and retrieve the subscriber services stored in the database therein. The ISUP call -setup protocol is widely deployed in many LSs (such as 13a–n shown in FIG. 1) today, and only minor changes are made to a routing table stored within each existing LS 13 in order to enable the modified LSs 31a–n to utilize the present invention. The routing table is modified to route the IAM 22 (FIG. 2) to the ViSSP 50. For LSs which are not ISUP-capable, the modified routing table is located in a modified SSP/T 32 associated with the originating LS 31a. The techniques for modifying a routing table are well known within the art, and need not be elaborated on here. The modifications made to the SCP 19 of FIG. 1, in creating the ViSSP 50 of FIG. 5, are described below.

Figure 6:
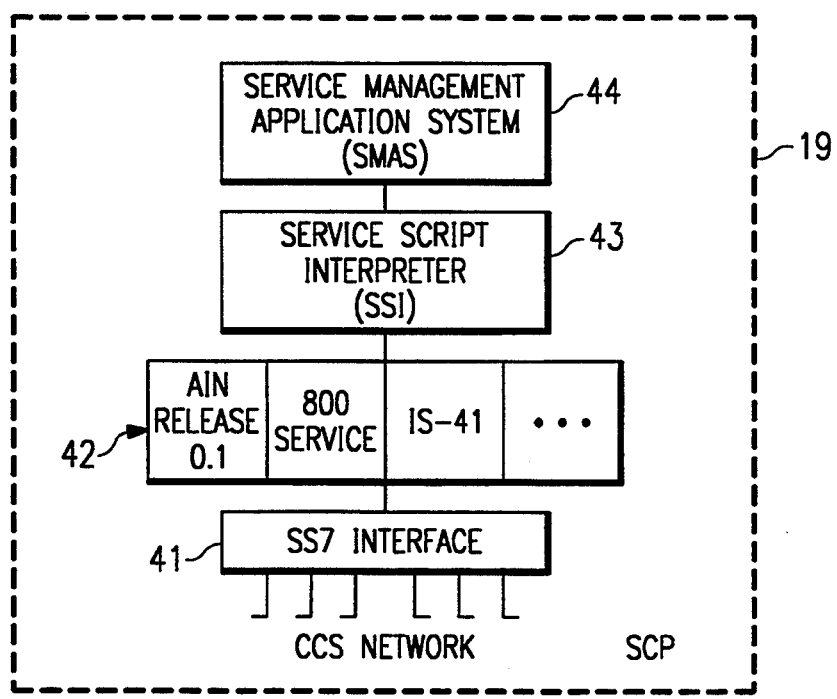
FIG. 6 (Prior Art) is a simplified block diagram of a portion of the architecture of an existing SCP within an AIN.

FIG. 6 is a simplified block diagram of a portion of the architecture of an existing SCP 19 within an Advanced Intelligent Network (AIN). The SCP 19 includes an interface for the SS7 signaling protocol 41, Transaction Capabilities Application Part (TCAP) blocks of software called "protocol translators" 42, a database program known as the Service Script Interpreter (SSI) 43, and an operational support system known as the Service Management Application System (SMAS) 44.

Signals from the CCS high-speed network enter the SCP 19 through the SS7 interface 41. Several different signaling protocols are used in the CCS network to retrieve different subscriber services from the SCP 19. Therefore, the SCP 19 includes TCAP protocol translators 42 for each of the signaling protocols used. Incoming signals are then routed to the applicable TCAP protocol translator for the subscriber service being requested. The TCAP protocol translator communicates the requested service to the SSI database program 43 which retrieves the requested service from the SCP database. The SMAS operating system 44 oversees the entire operation of the SCP 19.

FIG. 7 is a simplified block diagram of a portion of the architecture of a ViSSP 50 within an AIN, which has been modified in accordance with the teachings of the present invention. The ViSSP 50 includes the interface for the SS7 signaling protocol 41, TCAP protocol translators 52 including a newly added ISUP protocol translator 53, a modified Service Script Interpreter (SSI) 54, and a modified SMAS operating system 55. The modifications to the ViSSP 50 result in the ViSSP 50 performing AIN-type services (e.g., number translation) using parameters in the ISUP call-setup protocol that were originally intended for conditions such as call forwarding. This alternative use of the I SUP call-setup protocol allows the introduction of new services in a multi-vendor network using existing technology already in place.

Signals from the CCS high-speed network enter the ViSSP 50 through the SS7 interface 41. Then, since several different signaling protocols are used in the CCS network to request different subscriber services, the ViSSP 50, like the SCP 19, includes TCAP protocol translators 52 for communication with the modified SSI database program 54.

In the preferred embodiment of the system of the present invention, an ISUP interface is added to the architecture of the SCP 19, in order to create the ViSSP 50. The ISUP interface may comprise an ISUP protocol translator 53 which is added to the TCAP protocol translators 52, as well as a modified SSI 52 and a modified SMAS 55. The implementation of these modifications enables LSs to utilize the ISUP call-setup protocol to direct the SSI database program 54 to access many of the enhanced subscriber services stored within the ViSSP 50. Services which may be created and deployed by the present invention may include, but are not limited to, 800 Service, Credit Card Verification, Geographic Call Routing, Incoming Call Screening, Multilocation Extension Dialing, Network Automatic Call Distribution, Flexible Carrier Selection, and Flexible Call Forwarding.

FIG. 8 is a block diagram showing the signaling links 61 and 62 and looped circuits 63 and 64 between the ViSSP 50 and the SSP/T 32 in the preferred embodiment of the present invention. When the ViSSP 50 first receives an ISUP message, a software mapping unit within the ISUP protocol translator 53 (FIG. 7) verifies that the message includes a Circuit Identification Code (CIC) which belongs to a defined "virtual" voice circuit pair. A virtual voice circuit pair, illustrated as VCIC1 and VCIC2 in FIG. 8, comprises two voice circuits (CIC1 and CIC2) that are physically linked by a looped voice circuit 63 in the originating SSP/T 32. The ISUP protocol translator 53 maintains a mapping of these pairs through a looped virtual voice circuit 64 so that an ISUP message can be returned to the originating switch with the related CIC for the pair. If the CIC does not belong to a virtual voice circuit pair, then the ISUP protocol translator 53 sends the ISUP message, "Unequipped Circuit Identification Code (UCIC) back to the originating switch.

After receiving the message and verifying the CIC, the ISUP protocol translator 53 changes the CIC in the message to the related CIC of the virtual voice circuit pair. Additionally, an Originating Point Code (OPC) and a Destination Point Code (DPC) are swapped. The ISUP protocol translator 53 then checks the message type. If the message type indicates an ISUP Initial Address Message (IAM), the software mapping unit within the protocol translator 53 maps it into a Query message to the SSI 54. The IAM message parameters are translated into "SSI message tags".

FIG. 9 illustrates representative parameters of an ISUP IAM message and an IAM (Call-Forward) message and their associated SSI tags. The IAM parameters may vary from time to time as new industry standards are promulgated, but the basic implementation of the present invention does not change. FIG. 9 identifies those tags which are newly created tags enabling use of the IAM format with the ViSSP 50.

The ISUP protocol translator 53 seizes the interface to the SSI 54, and sends the tags to the SSI using a simple query and response access. The SSI database program is modified to recognize the newly created tags. To the SSI software, the IAM appears to be an AIN Release 0.1 Info$_{13}$ Analyzed message requesting retrieval of a subscriber service. The ViSSP's Service Logic Program within the SSI 54 processes the IAM query and returns the tags (possibly modified by the SSI service logic) to the ISUP protocol translator 53. The ISUP protocol translator includes a new routing number (translated destination) which is loaded into a called-party number included in an IAM (Call-Forward) message. The IAM (Call-Forward) message is an IAM which is sent from the ViSSP 50 back to the originating LS 31a. The IAM (Call-Forward) message directs the originating LS 31a to initiate a new call to the new translated destination. The dialed number from the original IAM is loaded into the original called-party number parameter.

If the ISUP protocol translator 53 checks the received message type and determines that the received message is not an IAM, then 'the ISUP protocol translator 53 returns the message to the originating switch. Thus, the message is essentially looped back to the related CIC in the virtual circuit pair. The ISUP messages that are analyzed for message type may include, but are not limited to:

Address Complete (ACM)
Answer (ANM)
Blocking (BLO)
Blocking Acknowledgement (BLA)
Circuit Group Blocking (CGB)
Circuit Group Blocking Acknowledgement (CGBA)
Circuit Group Reset (CGR)
Circuit Group Reset Acknowledgement (CGRA)
Circuit Group Unblocking (CGU)
Circuit Group Unblocking Acknowledgement (CGUA)
Circuit Query (CQM)
Circuit Query Response (CQR)
Circuit Reservation (CRM)
Circuit Reservation Acknowledgement (CRA)
Circuit Validation Test (CVT)
Circuit Validation Response (CVR)
Continuity (COT)
Continuity Check Request (CCR)

Exit (EXM)
Initial Address Message (IAM)
Loop Back Acknowledgement (LBA)
Call Progress (CPM)
Confusion (CON)
Release (REL)
Release Complete (RLC)
Reset Circuit (RSC)
Resume (RES)
Suspend (SUS)
Unblocking (UBL)
Unblocking Acknowledgement (UBA)
Unequipped Circuit Identification Code (UCIC)

Figure 10:
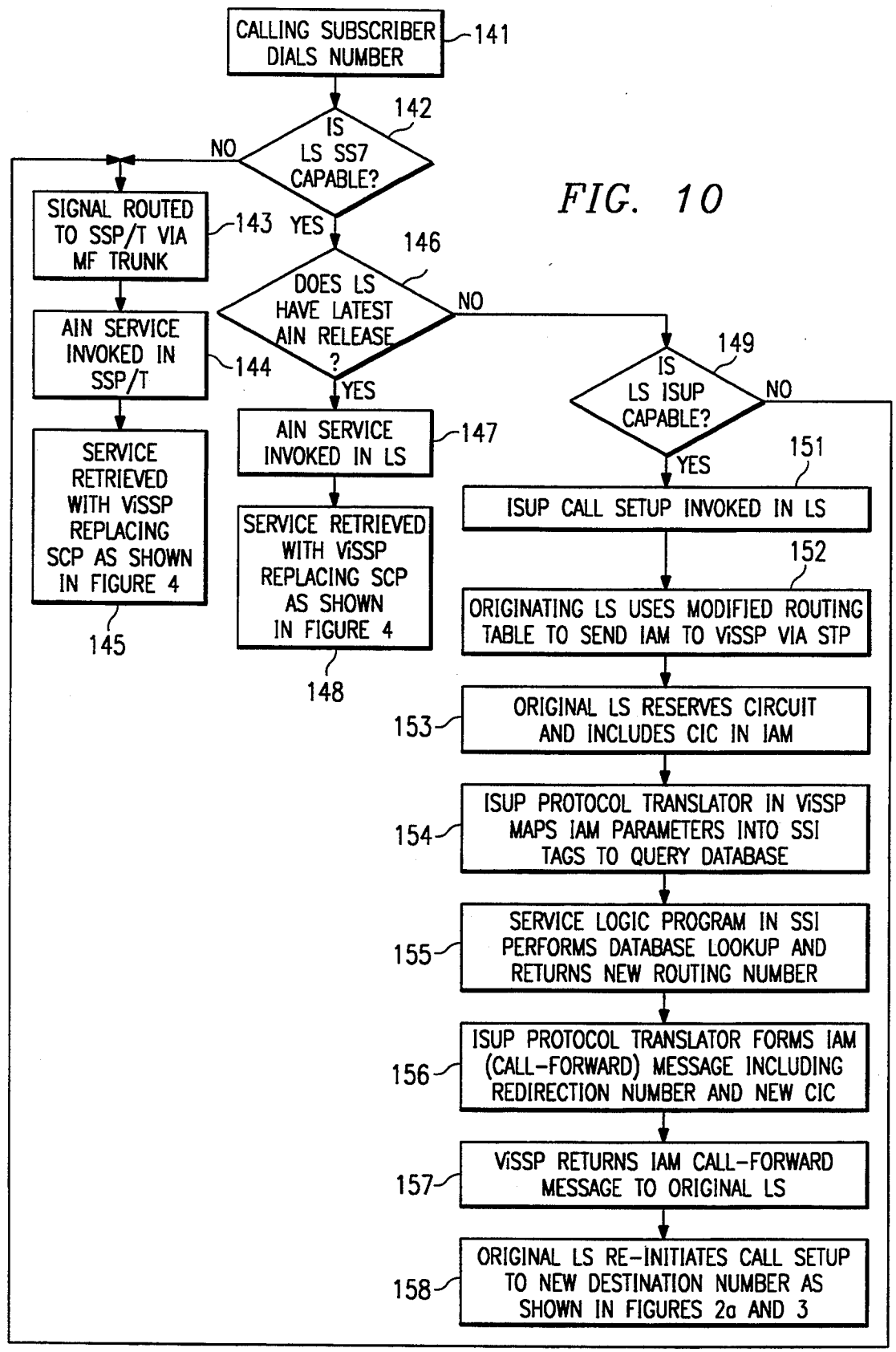
FIG. 10 is a flow chart of a typical message flow utilized in the preferred embodiment of the present invention when a modified LS or SSP/T retrieves enhanced subscriber services from a ViSSP.

FIG. 10 is a flow chart of a typical message flow utilized in the preferred embodiment of the present invention when a modified LS 31 (FIG. 5) or SSP/T 32 retrieves enhanced subscriber services from a ViSSP 50. At step 141, a calling subscriber 16a dials the number of a called subscriber 16n. At step 142, it is determined whether or not the originating LS 31a has been modified to utilize the SS7 signaling protocol. If not, then the signal is routed, at 143, to the associated SSP/T 32 via a MF trunk. At 144, AIN service is invoked in the SSP/T 32. At 145, the service is retrieved from the ViSSP 50 utilizing steps 125 through 129 of FIG. 4, with the ViSSP 50 replacing the SCP 19.

If, however, at step 142, it is determined that the originating LS 3l*a* is SS7-capable, then it is determined at 146 whether or not the originating LS 31a has been upgraded with the latest release of the TCAP/AIN communications protocol. If the LS 31a has been upgraded with TCAP/AIN, then AIN service is invoked in the LS 31a at step 147. Thereafter, at step 148, the enhanced subscriber service is retrieved from the ViSSP 50 utilizing steps 133 through 137 of FIG. 4, with the ViSSP 50 replacing the SCP 19.

Figure 4:
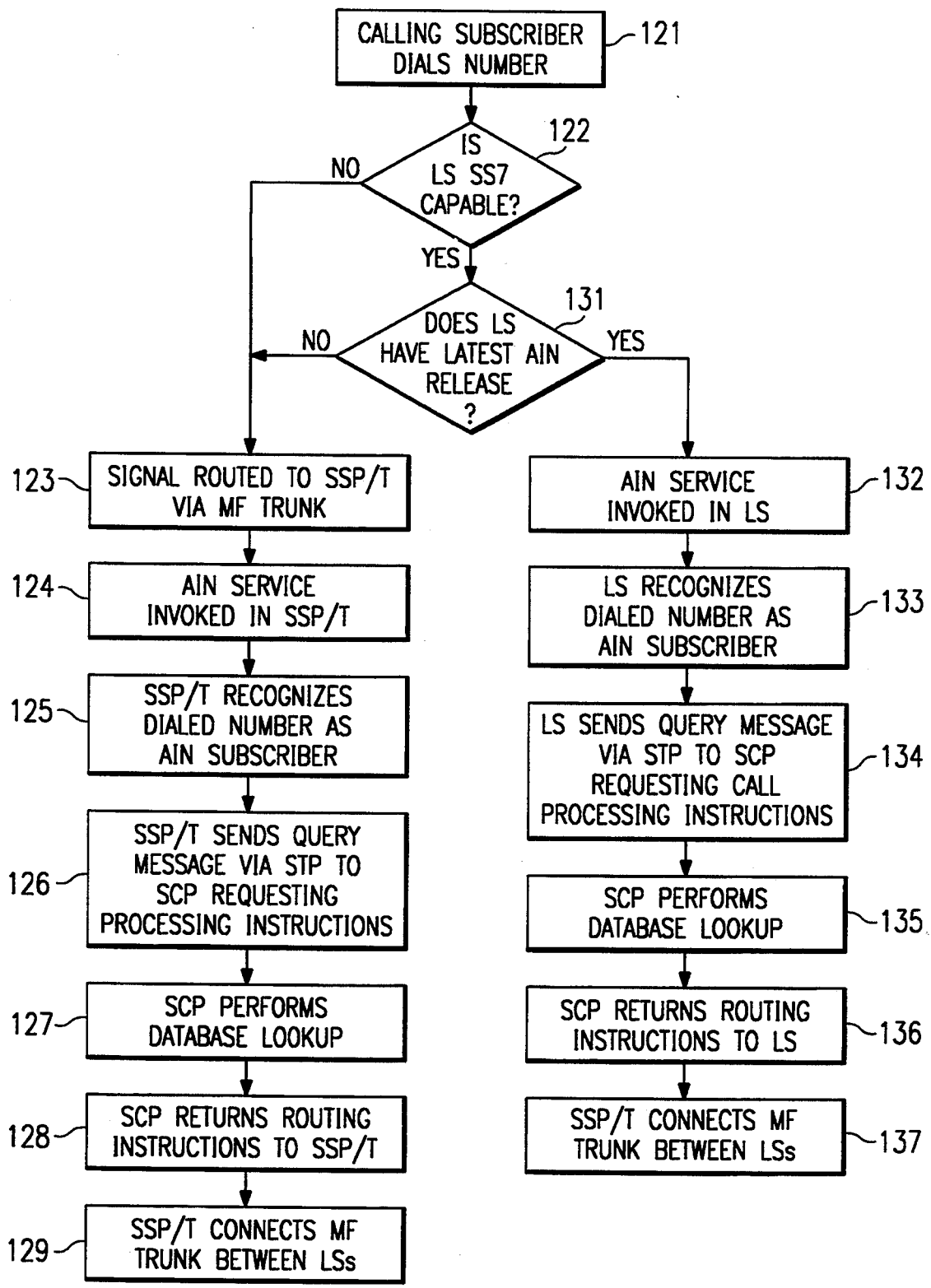
FIG. 4 (Prior Art) is a flow chart illustrating the message flows involved in determining the type of access provided for different LSs, and in the method of service retrieval, from a database stored in a Service Control Point (SCP)

Unlike FIG. 4, however, if it is determined at step 146 that the originating LS 31a is not upgraded with the TCAP/AIN communications protocol, the system of the present invention does not have to revert to routing the signal through a MF trunk to the SSP/T 32. Instead, the message flow moves to step 149 where it is determined whether or not the originating LS 31a has been upgraded to communicate with the ISUP call-setup protocol. Only if the LS 31a has not been upgraded with the ISUP protocol does the system move to seep 143 where the signal is routed to the associated SSP/T 32 via a MF trunk.

If, however, the originating LS 31a is one of the many LSs which have been upgraded to communicate utilizing the ISUP call-setup protocol, then the message flow moves to step 151 where ISUP call setup is invoked in the LS 31a. At step 152, the originating LS 31a uses its modified routing table to send an ISUP Initial Address Message (IAM) to the ViSSP 50. At 153, the LS 31a reserves a MF circuit on a looped trunk and includes a Circuit Identification Code (CIC) in the signaling information field (SIF) along with the IAM. The CIC code that is used by the LS 31a in the initial IAM message identifies a circuit that is looped back into the same LS 31a since the ViSSP 50 does not have any MF circuits.

Figure 2A:
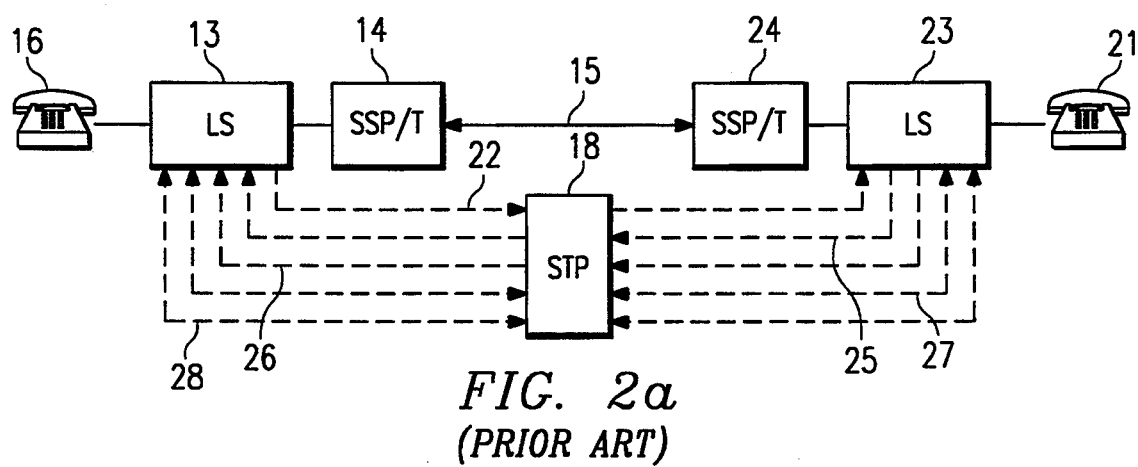
FIG. 2*a* (Prior Art) is a simplified block diagram illustrating a typical message flow utilized for call setup between two LSs which have been upgraded to utilize the ISUP call-setup protocol.
Figure 3:
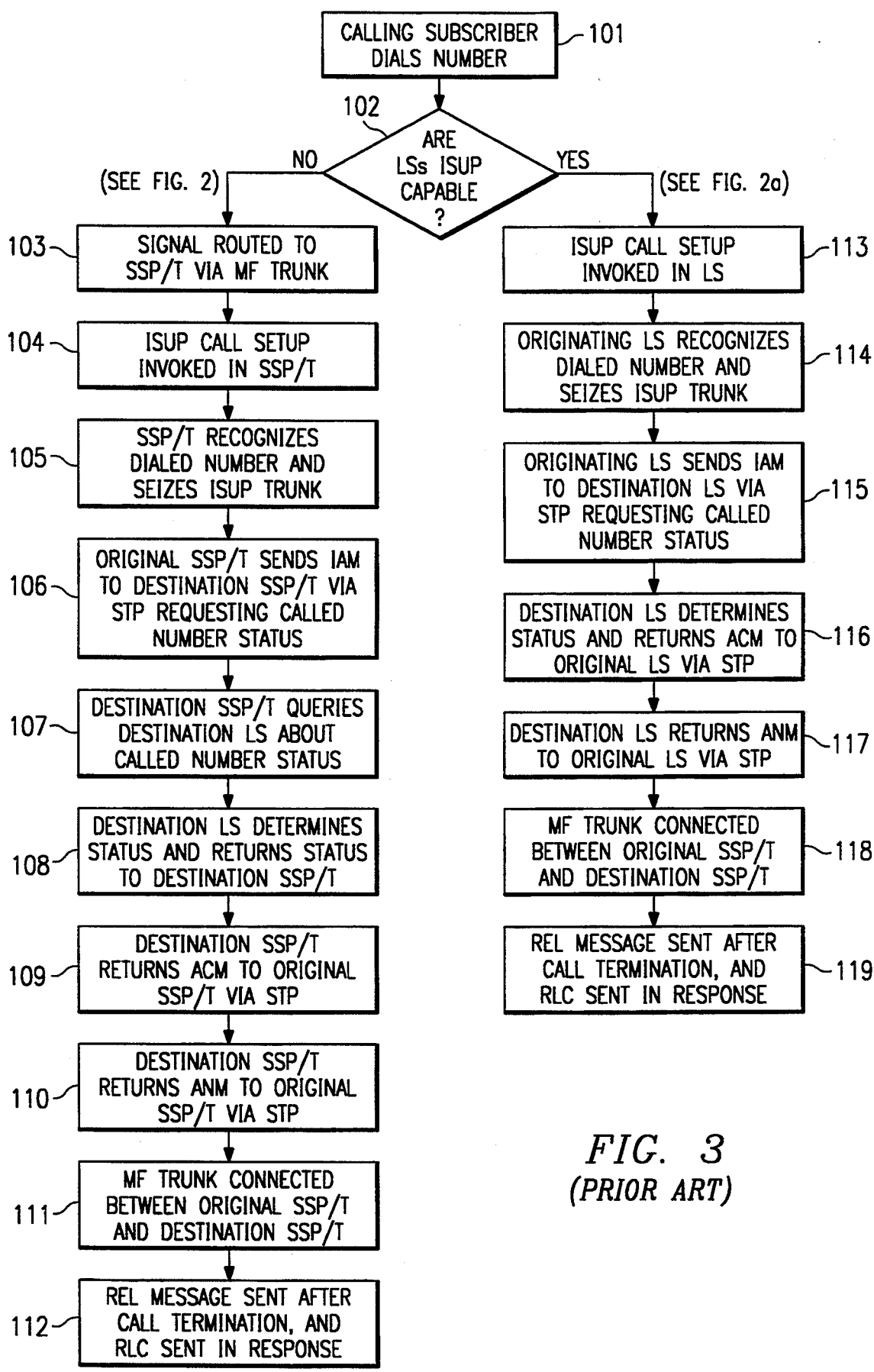
FIG. 3 (Prior Art) is a flow chart illustrating the typical message flows involved in setting up a call via the ISUP call-setup protocol, for both non-ISUP and ISUP-capable LSs.
Figure 3A:
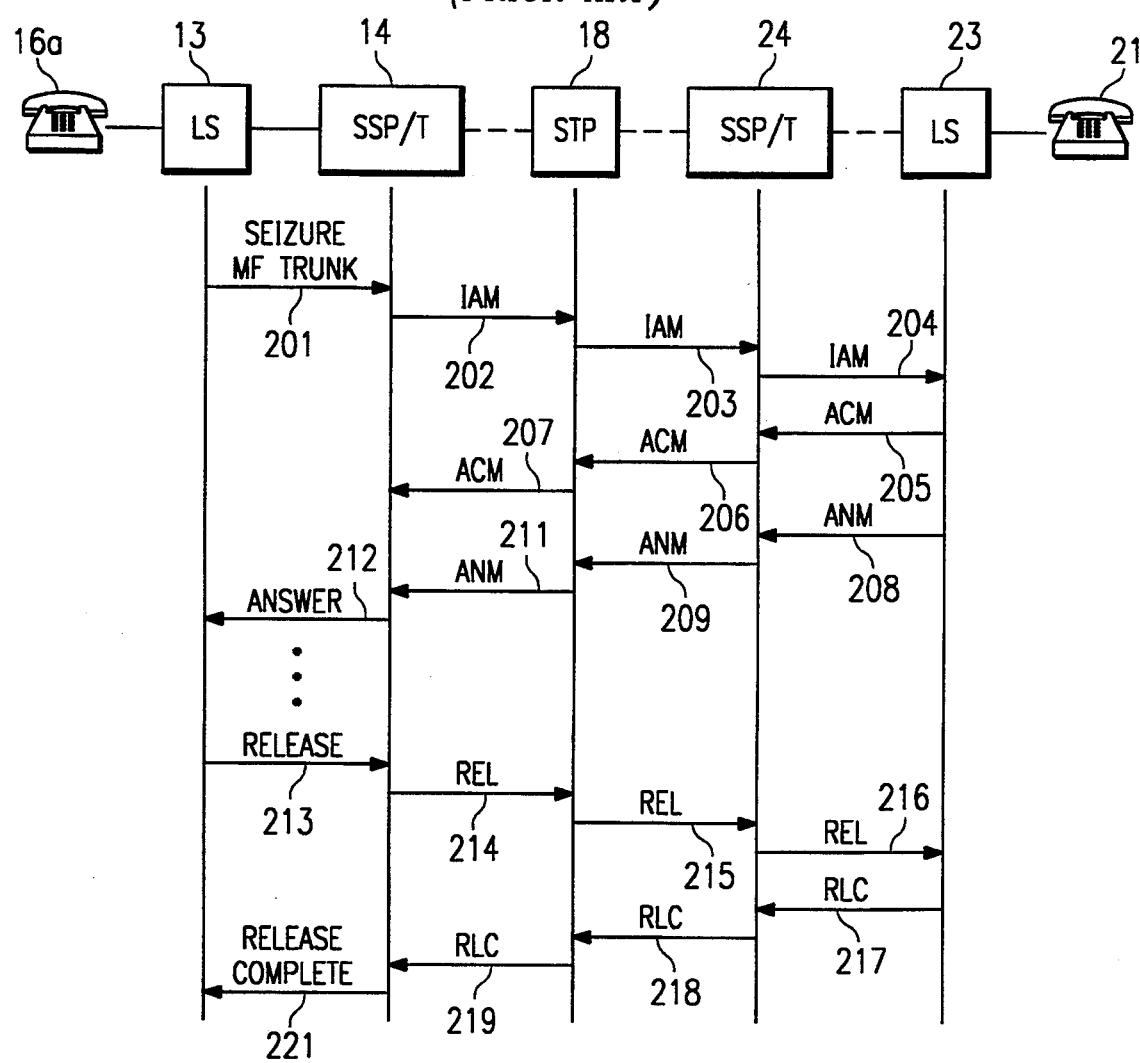
FIG. 3*a* (Prior Art) is a message flow diagram illustrating the flow of messages from a non-I SUP LS to an ISUP-capable LS during call setup and call release.

At 154, the ViSSP 50 receives the IAM, and the ISUP protocol translator 53 maps it into a Query message to the service script interpreter (SSI) 54. The IAM parameters are mapped into SSI tags (FIG. 9) for this purpose. To the SSI software, the IAM appears as an AIN Release 0.1 Info—Analyzed message requesting retrieval of a subscriber service. At 155, the ViSSP's Service Logic Program within the SSI 54 processes the IAM query, performs a database lookup, and returns a new routing number. The dialed number from the original IAM is loaded into the original called-party number parameter. At 156, the called-party number parameter is included in an IAM (Call-Forward) message which includes a new CIC code in order to prevent a dual seizure of the same circuit that the LS 31a used. The new translated number is loaded into the called-party number parameter. If the new translated number is to be presented, then it is loaded into the Redirection Number and Redirection Information parameters. The ViSSP contains information on the CIC codes used by the LSs so that a valid CIC code is used in the return IAM (Call-Forward) message. The ViSSP returns the IAM to the originating LS 31a at step 157. The originating LS 31a receives the IAM (Call-Forward) message, and, at step 158, re-initiates call setup by sending another IAM message to the new destination number that was contained in the IAM (Call-Forward) message received from the ViSSP 50. Thereafter, with the exception of the release sequence described below in conjunction with FIG. 11, call processing continues as specified in TR-NWT000317, as described above and illustrated in FIGS. 2, 2a, and 3.

Referring again to FIG. 5, the LS 31a forwards all additional ISUP messages to the ViSSP 50 that it receives in response to the returned IAM (Call-Forward) message. The ViSSP 50, in turn, sends the ISUP messages back to the LS 31a. In this manner, the LS 31a is, in essence, routing messages back to itself. Continuity checks may be optionally suppressed on the MF circuits that are looped.

Figure 11:
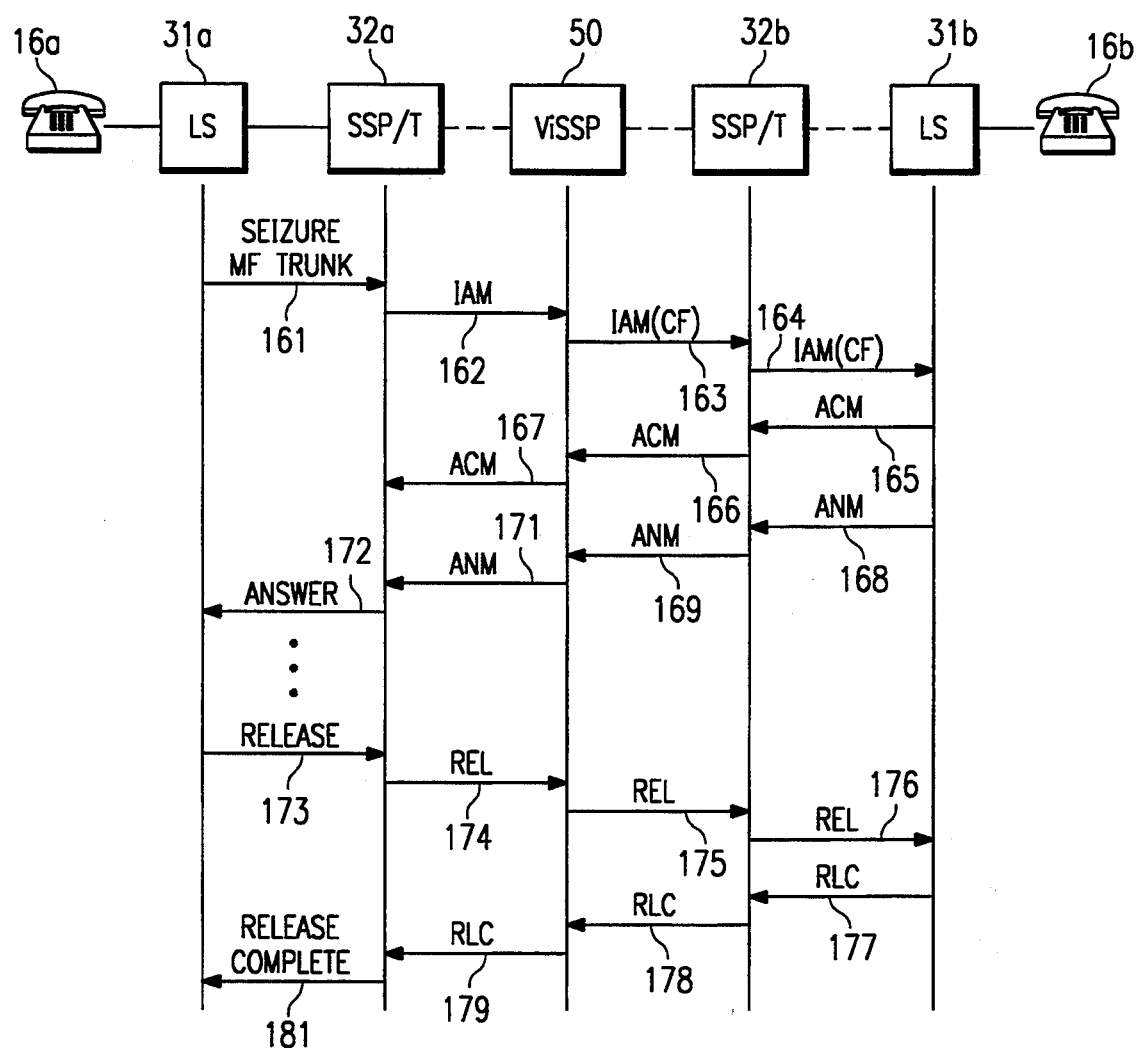
FIG. 11 is a message flow diagram illustrating the flow of messages utilized for the retrieval of an enhanced subscriber service from the ViSSP 50, call setup, and call release in the preferred embodiment of the present invention.

FIG. 11 is a message flow diagram illustrating the flow of messages utilized for the retrieval of an enhanced subscriber service from the ViSSP 50, call setup, and call release in the preferred embodiment of the present invention. At 161, the LS 31a serving the calling subscriber 16a seizes an MF trunk to the SSP/T 32a. At 162, the SSP/T sends an IAM to the ViSSP 50 which translates the message into an IAM (Call Forward) message and sends it to the SSP/T 32b serving the called subscriber at 163. At 164, the IAM (Call Forward) is sent to the LS 31b serving the called subscriber. At 165, an Address Complete Message (ACM) is sent from the LS 31b to the SSP/T 32b where it is forwarded to the ViSSP 50 at 166. The ViSSP forwards the ACM to the SSP/T 32a at 167. At 168, an Answer message (ANM) is sent from the LS 31b to the SSP/T 32b where it is forwarded to the ViSSP 50 at 169. The ViSSP forwards the ANM to the SSP/T 32a at 171. At 172, the answer is sent over the MF trunk to the LS 31a.

When the first subscriber hangs up (in this example, subscriber 16a), a release signal is sent over the MF trunk from the LS 31a to the SSP/T 32a at 173. A release message (REL) is sent at 174 to the ViSSP 50 which forwards the REL at 175 to the SSP/T 32b serving the other subscriber. At 176, the SSP/T 32b sends a REL to the LS 3b serving the other subscriber. The LS 3b sends a release complete message (RLC) to the SSP/T 32b at 177 which forwards the RLC to the ViSSP 50 at 178. At 179, the ViSSP 50 forwards the RLC to the SSP/T 32a serving the first subscriber to hang up, directing that the MF voice link be disconnected. At 181, the voice link is disconnected.

It can be seen that the originating LS 31a performs only those functions which it would ordinarily perform to accomplish call setup. However, due to the modified routing instructions, and the modifications to the SCP 19 creating the ViSSP 50, the LS 31a actually queries the ViSSP 50 for instructions on how to process the call. The modifications to the ViSSP cause it to accept the ISUP IAM and respond with routing instructions inserted as a parameter in the ISUP IAM (Call -Forward) message. Thus a system is provided having a database of enhanced subscriber services, which may be accessed by LSs, but does not require the expensive upgrading of LSs to operate with the TCAP/AIN communications protocol.

The present invention also provides a system which enables all LSs 31a, which are SS7-capable and ISUP capable, to connect directly into the AIN 12 via the CCS network, and retrieve enhanced subscriber services, rather than using slower MF trunks through the SSP/T 32. Currently, LSs 13 (FIG. I) having SS7 and ISUP capability for call setup, but not, for example, 800 service capability, must access 800 service through the SSP/T 14 and slow speed MF trunks 15. The present invention enables these LSs to access enhanced subscriber services in the ViSSP 50 (FIG. 5) entirely over high speed SS7 links using existing technology already in place.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of retrieving and delivering services to subscribers of a telecommunications network having at least one local switch and an advanced intelligent network comprising at least one service switch point/tandem and at least one database of subscriber services, said method comprising the steps of:

sending messages over said advanced intelligent network utilizing the Signaling System 7 signaling protocol;

formatting messages for retrieval of subscriber services from said database utilizing a Transaction Capabilities Application Part/Advanced Intelligent Network protocol translator;

formatting messages for retrieval of subscriber services from said database utilizing an Integrated Services Digital Network User Part protocol translator;

determining whether or not said local switch is capable of utilizing said Signaling System 7 signaling protocol;

routing messages from said local switch to said service switch point/tandem if said local switch is not capable of utilizing said Signaling .System 7 signaling protocol;

determining whether or not said local switch is capable of communicating with said Transaction Capabilities Application Part/Advanced Intelligent Network protocol translator, if said local switch is capable of utilizing said Signaling System 7 signaling protocol;

sending messages back and forth from said local switch to said database of subscriber services if said local switch is capable of utilizing said Signaling System 7 signaling protocol and capable of communicating with said Transaction Capabilities Application Part/Advanced Intelligent Network protocol translator;

determining whether or not said local switch is capable of utilizing the Integrated Services Digital Network User Part call-setup protocol, if said local switch is capable of utilizing said Signaling System 7 signaling protocol, but is not capable of communicating with said Transaction Capabilities Application Part/Advanced Intelligent Network protocol translator;

routing messages from said local switch to said service switch point/tandem if said local switch is capable of utilizing said Signaling System 7 signaling protocol, but is not capable of communicating with said Transaction capabilities Application Part/Advanced Intelligent Network protocol translator and is not capable of utilizing said Integrated Services Digital Network User Part call-setup protocol; and sending messages back and forth from said local switch to said database of subscriber services, utilizing said Integrated Services Digital Network User Part call-setup protocol, if said local switch is capable of utilizing said Signaling System 7 signaling protocol and said Integrated Services Digital Network User Part call-setup protocol, but is not capable of communicating with said Transaction Capabilities Application Part/Advanced Intelligent Network protocol translator.

2. The method of claim 1 wherein the step of sending messages back and forth from said local switch to said database of subscriber services, utilizing said Integrated Services Digital Network User Part call-setup protocol includes sending an Initial Address Message to said database.

3. The method of claim 2 wherein the step of sending an Initial Address Message to said database includes routing said Initial Address Message to said database utilizing a modified routing table in said local switch.

4. The method of claim 3 wherein the step of sending an Initial Address Message to said database includes modifying a parameter of said Initial Address Message with a circuit identification code.

5. The method of claim 4 wherein the step of formatting messages for retrieval of subscriber services from said database, utilizing said Transaction Capabilities Application Part/Advanced Intelligent Network protocol translator, includes mapping parameters of said Initial Address Message into Service Script Interpreter tags readable by said database.

6. The method of claim 5 wherein the step of sending messages back and forth from said local switch to said database of subscriber services, utilizing said Integrated Services Digital Network User Part call-setup protocol, includes returning a redirection number in an Initial Address Message (Call-Forward) message sent from said database to said local switch.

* * * * *